(12) United States Patent
Kaminski et al.

(10) Patent No.: US 10,146,688 B2
(45) Date of Patent: Dec. 4, 2018

(54) SAFE WRITE-BACK CACHE REPLICATING ONLY DIRTY DATA

(71) Applicant: Intel Corporation, Santa Clara, CA (US)

(72) Inventors: Maciej Kaminski, Gdansk (PL); Andrzej Jakowski, Gdansk (PL); Piotr Wysocki, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/393,863

(22) Filed: Dec. 29, 2016

(65) Prior Publication Data

US 2018/0189178 A1    Jul. 5, 2018

(51) Int. Cl.
| G06F 12/08 | (2016.01) |
| G06F 12/0811 | (2016.01) |
| G06F 12/0846 | (2016.01) |
| G06F 12/128 | (2016.01) |
| G06F 12/0871 | (2016.01) |

(52) U.S. Cl.
CPC ...... *G06F 12/0811* (2013.01); *G06F 12/0851* (2013.01); *G06F 12/0871* (2013.01); *G06F 12/128* (2013.01); *G06F 2212/283* (2013.01); *G06F 2212/604* (2013.01); *G06F 2212/621* (2013.01); *G06F 2212/69* (2013.01)

(58) Field of Classification Search
CPC .. G06F 12/08; G06F 12/0871; G06F 12/0811; G06F 12/0851; G06F 12/128
USPC .................................................. 711/119, 120
See application file for complete search history.

(56) References Cited

U.S. PATENT DOCUMENTS

| 2002/0152357 A1* | 10/2002 | Takahashi | G06F 12/0646 711/119 |
| 2003/0212866 A1* | 11/2003 | Takahashi | G06F 12/0646 711/144 |
| 2008/0276040 A1* | 11/2008 | Moritoki | G06F 11/1441 711/113 |
| 2009/0055590 A1* | 2/2009 | Takahashi | G06F 11/1441 711/119 |
| 2011/0022801 A1* | 1/2011 | Flynn | G06F 9/52 711/120 |
| 2013/0036270 A1* | 2/2013 | Dreslinski | G06F 12/0893 711/128 |

OTHER PUBLICATIONS

U.S. Appl. No. 14/931,730, entitled "Redundant Array of Independent Disks (RAID) Write Hole Solutions", filed Nov. 3, 2015, 56 pages.
U.S. Appl. No. 14/843,581, entitled "Technologies for Managing a Reserved High-Perforrmance Memory Region of a Solid State Drive", filed Sep. 2, 2015, 36 pages.

(Continued)

*Primary Examiner* — Pierre Miche Bataille
(74) *Attorney, Agent, or Firm* — Jordan IP Law, LLC

(57) ABSTRACT

An embodiment of a cache apparatus may include a first cache memory, a second cache memory, and a cache controller communicatively coupled to the first cache memory and the second cache memory to allocate cache storage for clean data from one of either the first cache memory or the second cache memory, and allocate cache storage for dirty data from both the first cache memory and the second cache memory. Other embodiments are disclosed and claimed.

22 Claims, 8 Drawing Sheets

(56) References Cited

OTHER PUBLICATIONS

U.S. Appl. No. 15/201,056, entitled "Efficient Context Based Input/Output (I/O) Classification", filed Jul. 1, 2016, 50 pages.
U.S. Appl. No. 15/258,521, entitled "Aggressive Write-Back Cache Cleaning Policy Optimized for Non-Volatile Memory", filed Sep. 7, 2016, 42 pages.
U.S. Appl. No. 15/394,059, entitled "Persistent Storage Device With a Virtual Function Controller", filed Dec. 29, 2016, 37 pages.
U.S. Appl. No. 15/278,022, entitled "Apparatus and Method for Persisting Blocks of Data and Metadata in a Non-Volatile Memory (NVM) Cache", filed Sep. 27, 2016, 39 pages.
U.S. Appl. No. 15/282,478, entitled "Mass Storage Cache in Non Volatile Level of Multi-Level System Memory", filed Sep. 30, 2016, 45 pages.
U.S. Appl. No. 15/280,650, entitled "Cooperative Write-Back Cache Flushing for Storage Devices", filed Sep. 29, 2016, 47 pages.
U.S. Appl. No. 15/281,272, entitled "Device Driver to Provide Redundant Array of Independent Disks functionality", filed Sep. 30, 2016, 33 pages.

\* cited by examiner

SAFE WRITE-BACK CACHE REPLICATING ONLY DIRTY DATA

TECHNICAL FIELD

Embodiments generally relate to redundant storage systems. More particularly, embodiments relate to a safe write-back cache which replicates only dirty data.

BACKGROUND

A cache memory may be utilized to supplement a memory system. Unmodified data which is stored in the cache memory may be referred to as clean data. Data that is modified in the cache memory or otherwise is not yet written back in the memory system may be referred to as dirty data. One approach to providing data redundancy for the cache memory may include mirroring the cache memory to another device.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory (NVM) may be a storage medium that does not require power to maintain the state of data stored by the medium. Non-limiting examples of NVM may include any or a combination of: solid state memory (such as planar or 3-dimensional (3D) NAND flash memory or NOR flash memory), 3D cross point memory, storage devices that use chalcogenide phase change material (e.g., chalcogenide glass), byte addressable NVM devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, magnetoresistive random access memory (MRAM) that incorporates memristor technology, spin transfer torque MRAM (STT-MRAM), electrically erasable programmable read-only memory (EEPROM), other various types of non-volatile random access memories (RAMs), and magnetic storage memory. In some embodiments, 3D cross point memory may comprise a transistor-less stackable cross point architecture in which memory cells sit at the intersection of word lines and bit lines and are individually addressable and in which bit storage is based on a change in bulk resistance. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of random access memory (RAM), such as dynamic random access memory (DRAM) or static random access memory (SRAM), thyristor RAM (T-RAM) or zero-capacitor RAM (Z-RAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

Figure 1:
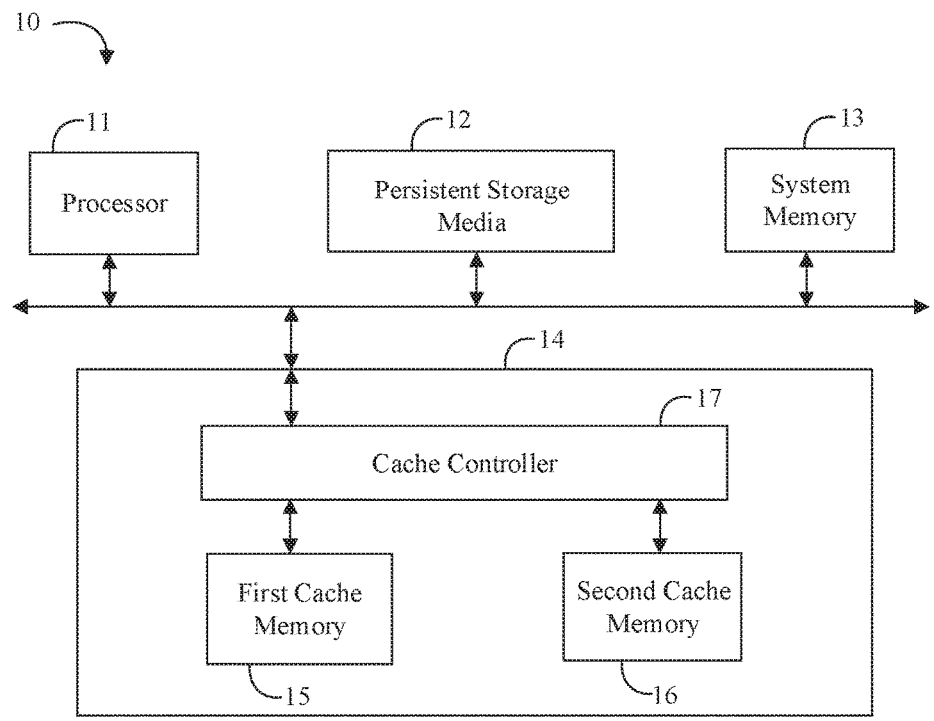
FIG. 1 is a block diagram of an example of an electronic processing system according to an embodiment.

Turning now to FIG. 1, an embodiment of an electronic processing system 10 may include a processor 11, persistent storage media 12 communicatively coupled to the processor 11, system memory 13 communicatively coupled to the processor 11, and a cache apparatus 14 communicatively coupled to the processor 11, the persistent storage media 12, and the system memory 13. The cache apparatus 14 may include a first cache memory 15, a second cache memory 16, and a cache controller 17 communicatively coupled to the first cache memory 15 and the second cache memory 16 to allocate a single cache line for clean data from one of either the first cache memory 15 or the second cache memory 16, and allocate two cache lines for dirty data including one cache line from the first cache memory 15 and one cache line from the second cache memory 16. For example, the clean data may comprise data which is unmodified with respect to corresponding data in the persistent storage media. The dirty data may comprise data which is modified with respect to corresponding data in the persistent storage media. Each of the first and second cache memories 15, 16 may comprise non-volatile memory. For example, the cache controller 17 may be further configured to interleave the clean data among the cache memories 15, 16 and/or to maintain a respective free list for each cache memory 15, 16.

Embodiments of each of the above processor 11, persistent storage media 12, system memory 13, cache apparatus 14, first cache memory 15, second cache memory 16, cache controller 17, and other components of the electronic processing system 10 may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively, or additionally, some operational aspects of these components may be implemented in one or more modules as a set of logic instructions stored in a machine- or computer-readable storage medium such as RAM, read only memory (ROM), programmable ROM (PROM), firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++, C# or the like and conventional procedural programming languages, such as the "C" programming language or similar programming languages.

Figure 2:
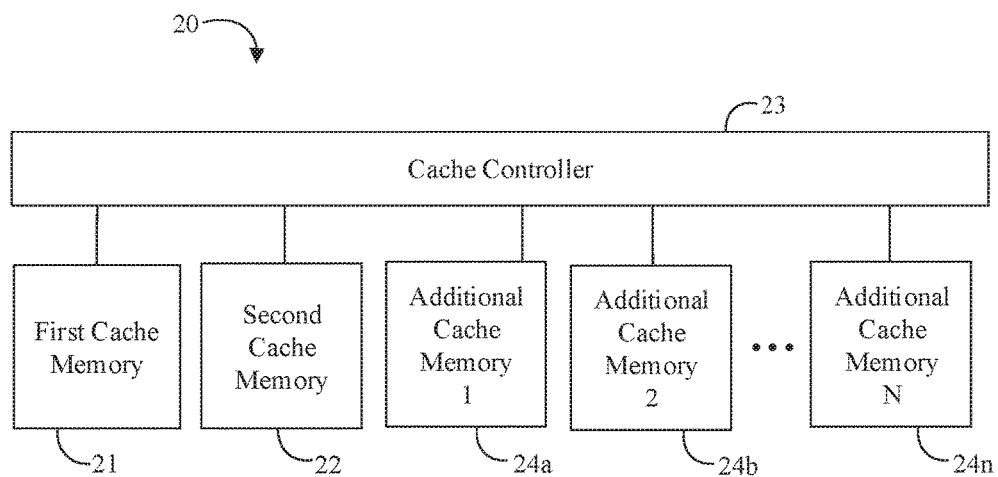
FIG. 2 is a block diagram of an example of a cache apparatus according to an embodiment.

Turning now to FIG. 2, an embodiment of a cache apparatus 20 may include a first cache memory 21, a second cache memory 22, and a cache controller 23 communicatively coupled to the first cache memory 21 and the second cache memory 22 to allocate cache storage for clean data from one of either the first cache memory 21 or the second cache memory 22, and allocate cache storage for dirty data from both the first cache memory 21 and the second cache memory 22. For example, the clean data may comprise data which is unmodified with respect to corresponding data in a persistent storage media. The dirty data may comprise data which is modified with respect to corresponding data in a persistent storage media. Each of the first and second cache memories 21, 22 may comprise non-volatile memory. For example, the cache controller 23 may be further configured to allocate a single cache line for clean data from one of the either first cache memory 21 or the second cache memory 22, and allocate two cache lines for dirty data including one cache line from the first cache memory 21 and one cache line from the second cache memory 23.

Some embodiments of the cache apparatus 20 may optionally further include one or more additional cache memories 24a, 24b through 24n communicatively coupled to the cache controller 23 to provide additional protection from data loss. The cache controller may then be further configured to allocate a single cache line for clean data from one of the either first cache memory 21, the second cache memory 22, or one of the additional cache memories 24a through 24n, and to allocate multiple cache lines for dirty data including one cache line from each of the first cache memory 21 and the second cache memory 22, and one cache line from each of the additional cache memories 24a through 24n. For example, each of the additional memories may comprise non-volatile memory.

In any of the foregoing embodiments of the cache apparatus 20, the cache controller 23 may be further configured to interleave the clean data among the cache memories (e.g. the first cache memory 21, the second memory 22, and the additional cache memories 24a through 24n) and/or to maintain a respective free list for each cache memory. In some embodiments of the cache apparatus 20, the amount of cache memory utilized for dirty data may be configurable. For example, the cache controller 23 may be further configured to retrieve a parameter which corresponds to the amount of cache capacity to allocate to dirty data and then to allocate that amount of cache capacity to dirty data.

Embodiments of each of the above first cache memory 21, second cache memory 22, cache controller 23, additional cache memories 24a through 24n, and other components of the cache apparatus 20 may be implemented in hardware, software, or any combination thereof. For example, hardware implementations may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, use of or some operational aspects of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++, C# or the like and conventional procedural programming languages, such as the "C" programming language or similar programming languages.

Figure 3A:
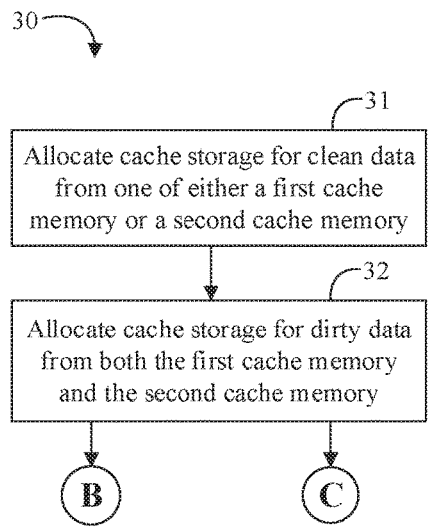
FIGS. 3A to 3C are flowcharts of an example of a method of managing a cache according to an embodiment.
Figure 3B:
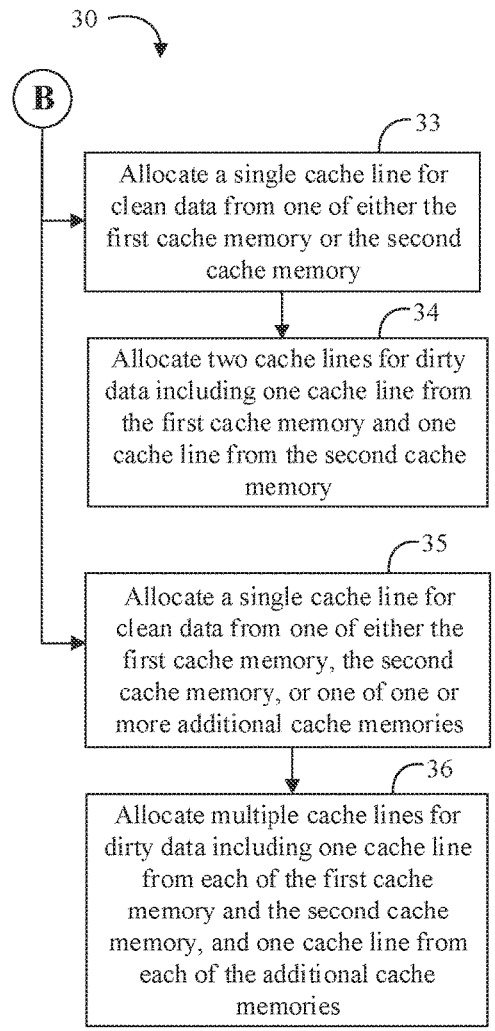
Figure 3C:
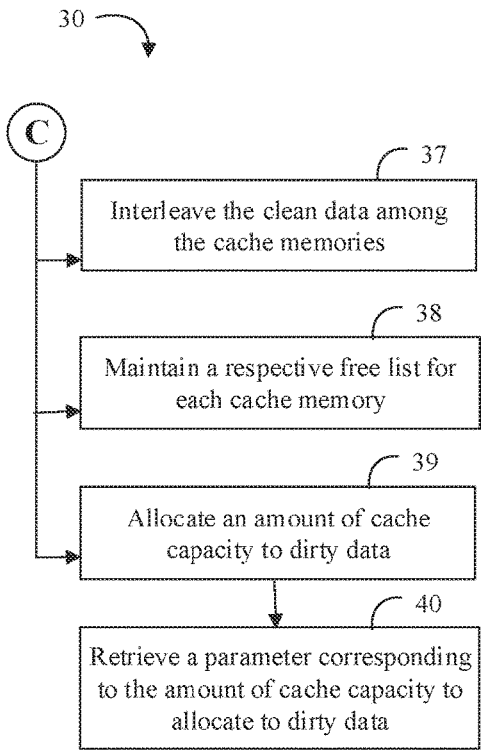

Turning now to FIGS. 3A to 3C, an embodiment of a method 30 of managing a cache may include allocating cache storage for clean data from one of either a first cache memory or a second cache memory at block 31, and allocating cache storage for dirty data from both the first cache memory and the second cache memory at block 32. For example, the method 30 may further include allocating a single cache line for clean data from one of either the first cache memory or the second cache memory at block 33, and allocating two cache lines for dirty data including one cache line from the first cache memory and one cache line from the second cache memory at block 34. In some embodiments (e.g. for triple redundancy or more), the method 30 may further include allocating a single cache line for clean data from one of either the first cache memory, the second cache memory, or one of one or more additional cache memories at block 35, and allocating multiple cache lines for dirty data including one cache line from each of the first cache memory and the second cache memory, and one cache line from each of the additional cache memories at block 36.

The method 30 may further include interleaving the clean data among the cache memories at block 37 and/or maintaining a respective free list for each cache memory at block 38. The method 30 may also include allocating an amount of cache capacity to dirty data at block 39 (e.g. based on saved configuration information). For example, the method 30 may include retrieving a parameter corresponding to the amount of cache capacity to allocate to dirty data at block 40.

Embodiments of the method 30 may be implemented in an electronic processing system or a cache apparatus such as, for example, those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++ or the like and conventional procedural programming languages, such as the "C" programming language or similar programming languages. For example, embodiments of the method 30 may be implemented on a computer readable medium as described in connection with Examples 27 to 36 below.

Advantageously, some embodiments may provide an improved or optimized replication technique for a write cache. For example, some embodiments may be utilized in a memory system including Intel® 3D XPoint™ memory, one or more solid-state disks (SSDs), one or more memory devices operating according to the Non-Volatile Memory Express (NVMe) Specification, revision 1.2a, published in October 2015 ("NVM Express specification" or "NVMe specification"). and/or other memory or storage technologies. Without being limited to theory of operation, when write-back caching is utilized there may a potential for data loss (e.g. dirty data loss) in the case of failure of a caching device. In some approaches, this problem may be addressed by mirroring a primary cache device data to another device (e.g. utilizing a redundant array of independent disks (RAID)-1 approach). Full mirroring of the cache, however, may not be an efficient approach, because not only dirty data may be replicated but also clean data. In accordance with some embodiments, replicating of clean data may not be needed because upon cache failure that data may be restored from a primary storage device which may have a good copy of the clean data.

Advantageously, some embodiments may provide a safe write-back cache where only dirty data is replicated outside of a single device failure domain. For example, some embodiments may provide data redundancy while also reducing cost associated with a secondary caching device (e.g. because the secondary device does not store a full copy of the primary cache data) and/or improved cache performance (e.g. because the secondary caching device may be utilized as extra cache capacity potentially increasing the cache hit rate and improving system performance). Some embodiments may provide the benefit of data redundancy in other applications where data may benefit from being replicated outside of a potential failure domain (e.g. on a NAND die, in a server application, etc.). For example, when a write-back cache is setup on a single memory device or die, the dirty data may be copied to another memory device or die to provide high availability.

One aspect of some embodiments may provide a method of allocating cache lines and inserting the data into a cache. Another aspect of some embodiments may provide an eviction method taking into consideration clean data duplicates. In some embodiments, for example, when clean data is being inserted into a cache, only one cache line may be allocated either on a primary or a secondary cache device. A cache line allocation scheme may interleave inserting the data into the primary and secondary caching devices so full throughput/bandwidth of an existing configuration may be utilized. In some embodiments, for example, when dirty data is being inserted into a cache, two cache lines may be allocated with one cache line from a primary cache device and a second cache line from a secondary cache device. The dirty data may then be inserted into the two cache lines. Input/output (IO) may be considered as completed to an application when both copies are persisted.

Advantageously, some embodiments may provide a redundant cache scheme where possibly no data may be lost when the primary or the secondary caching device fails. For example, clean data may be available either from the healthy caching device or from a primary storage. Dirty data may be available from at least the one healthy caching device because it was duplicated earlier at the time of cache insertion. In accordance with some embodiments, a user may also gain additional cache capacity, increasing cache hit ratio and overall system performance, without compromising data availability in case of a caching device failure. For example, for two identical primary and secondary cache devices, up to one hundred (100%) cache capacity may be gained when there is no dirty data.

Figure 4:
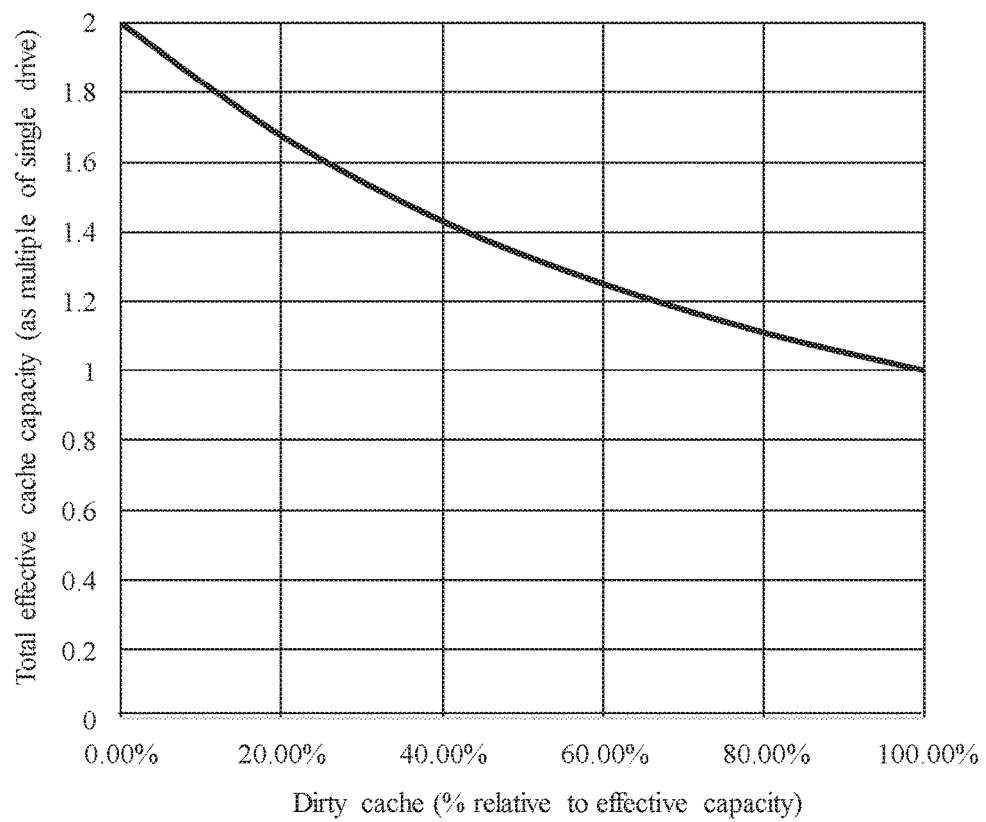
FIG. 4 is an illustrative graph of an example of total effective cache capacity versus dirty cache capacity according to an embodiment.

Turning now to FIG. 4, an example illustrative graph may show how a safe write-cache according to an embodiment may gain total effective capacity depending on an amount of dirty data in the cache. In accordance with some embodiments, an amount of dirty data residing in the cache may be configured and controlled against the desired configuration. For example, if a user decides to only allow up to ten percent (10%) of a primary cache capacity to be dirty, then at most 10% of the cache capacity needs to be replicated to the secondary device. Accordingly, the user may then have 1.8 times of the total cache capacity available (e.g. as compared with a standard RAID-1 mirror). Advantageously, some embodiment may provide a comparable level of data protection as for a RAID-1 mirror, while using the available cache capacity more efficiently.

Figure 5:
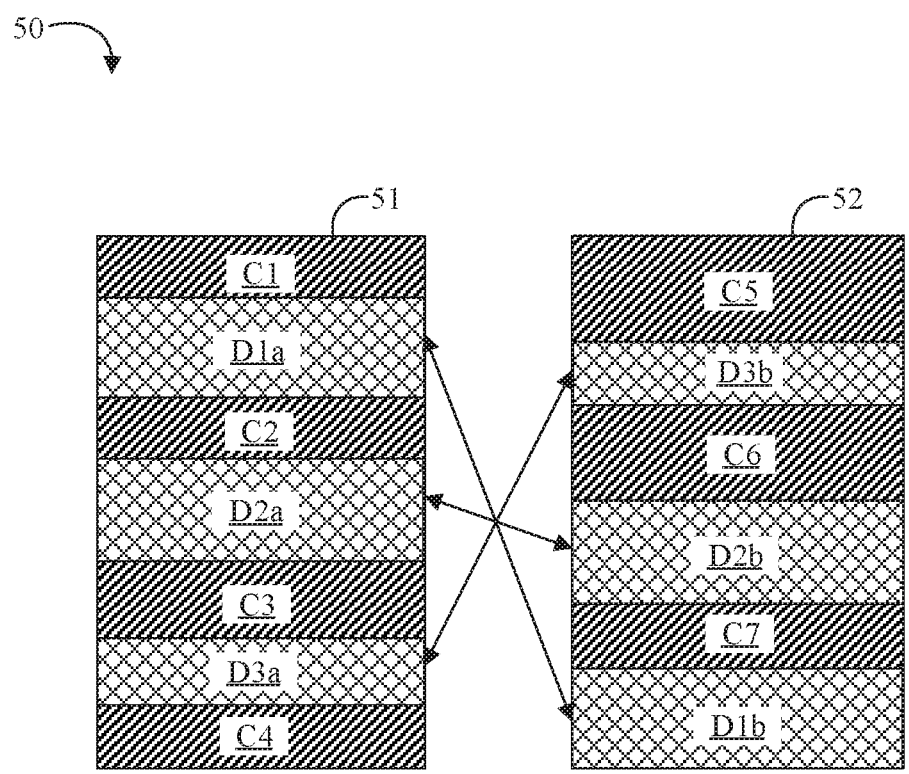
FIG. 5 is a block of an example of a cache apparatus according to an embodiment.

Turning now to FIG. 5, an embodiment of a cache apparatus 50 may include a primary cache device 51 and a secondary cache device 52. An illustrative diagram of data placement on the two caching devices 51, 52 shows clean data as a single crosshatch pattern and dirty data as a double crosshatch pattern. There is only one copy of each piece of clean data C1 through C7 maintained in the pool of caching devices 51, 52. On the other hand, for dirty data D1 through D3 there are two copies with one copy on each device. For example, dirty data D1*a* may reside on the primary cache device 51 while dirty data D1*b* (a copy of D1*a*) resides on the secondary cache device 52. In accordance with some embodiments, each portion of dirty data may be duplicated on both caching devices 51, 52 while each portion of clean data may be alternatingly inserted in the two cache devices 51, 52 in a round robin fashion to utilize the full throughout/bandwidth of the underlying devices 51, 52. Some embodiments may advantageously maintain multiple free lists (e.g. one free list per cache device) so that cache allocation routines may select cache lines from different cache devices efficiently without requiring extra processing power.

Figure 6:
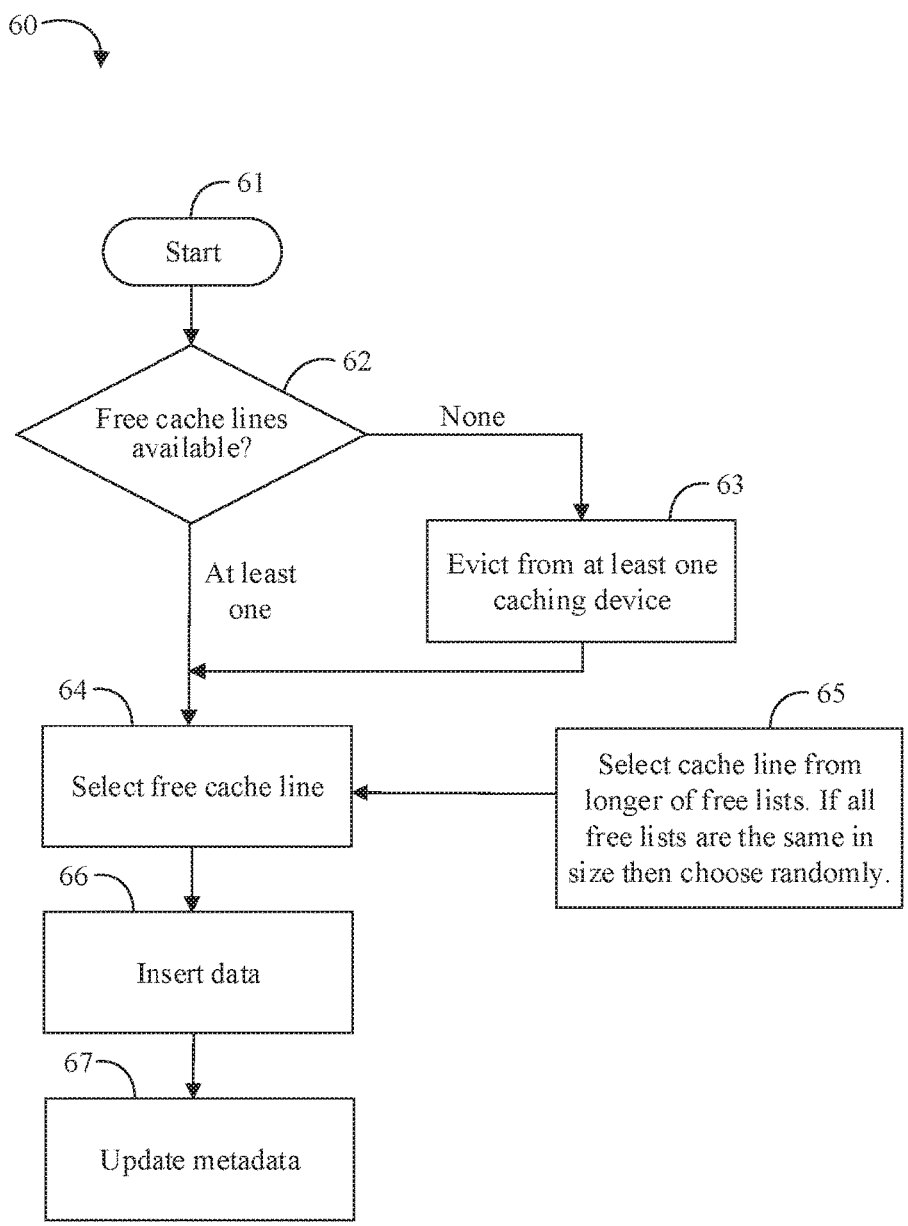
FIG. 6 is a flowchart of an example of inserting clean data in a cache according to an embodiment.

Turning now to FIG. 6, an embodiment of a method 60 of inserting clean data into cache may start at block 61. The method 60 may determine if free cache lines are available at block 62. If no cache lines are available at block 62, the method 60 may include evicting cache entries from at least one cache device at block 63 (e.g. as described in connection with FIG. 9 below) and continue to block 64 to select a free cache line. If at least one cache line is available at block 62, a free cache line may be selected at block 64. For example, the method 60 may optionally select the free cache line from the longest free list (e.g. or randomly if all free lists are the same size) at block 65. After the free cache line is selected, the cache data may be inserted at block 66 and the cache metadata may be updated at block 67.

Figure 7:
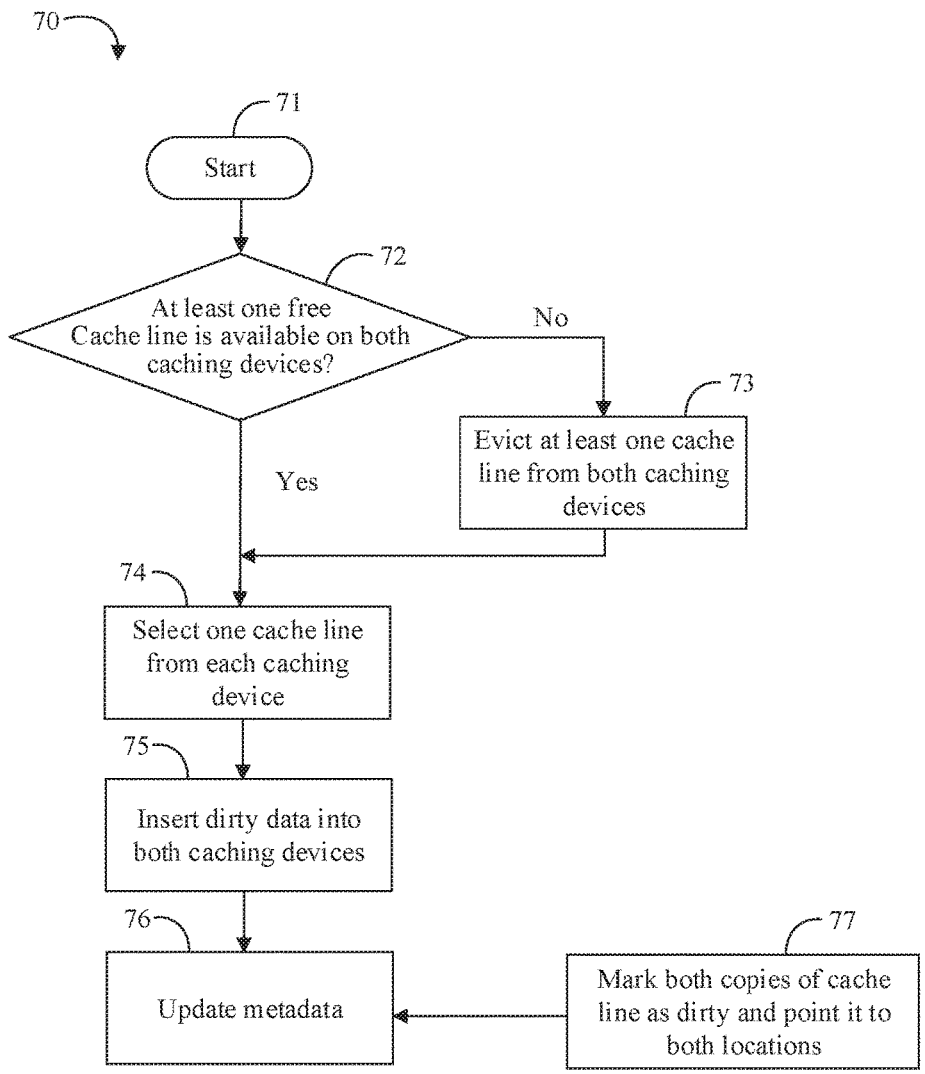
FIG. 7 is a flowchart of an example of inserting dirty data in a cache according to an embodiment.

Turning now to FIG. 7, an embodiment of a method 70 of inserting dirty data into cache may start at block 71. The method 70 may determine if at least one free cache line is available on all caching devices at block 72. If not enough cache lines are available at block 72, the method 70 may include evicting cache entries from at least one cache device at block 73 (e.g. or at least one cache line from both devices) and continue to block 74 to select a free cache line from each caching device. For example, eviction may be based on an eviction policy (e.g. a least recently used (LRU) policy, a local minimum policy (LMP), a least frequently used (LFU) policy, an adaptive replacement cache (ARC) policy, a first-in first out policy, a weighted round robin policy, etc.). If at least one cache line is available on all caching devices at block 72, a free cache line may be selected from each device at block 74. The dirty cache data may then be inserted into each cache device at block 75 and the cache metadata may be updated at block 76. For example, the method 70 may mark both copies of the cache line as dirty and point it to both locations at block 77.

Figure 8:
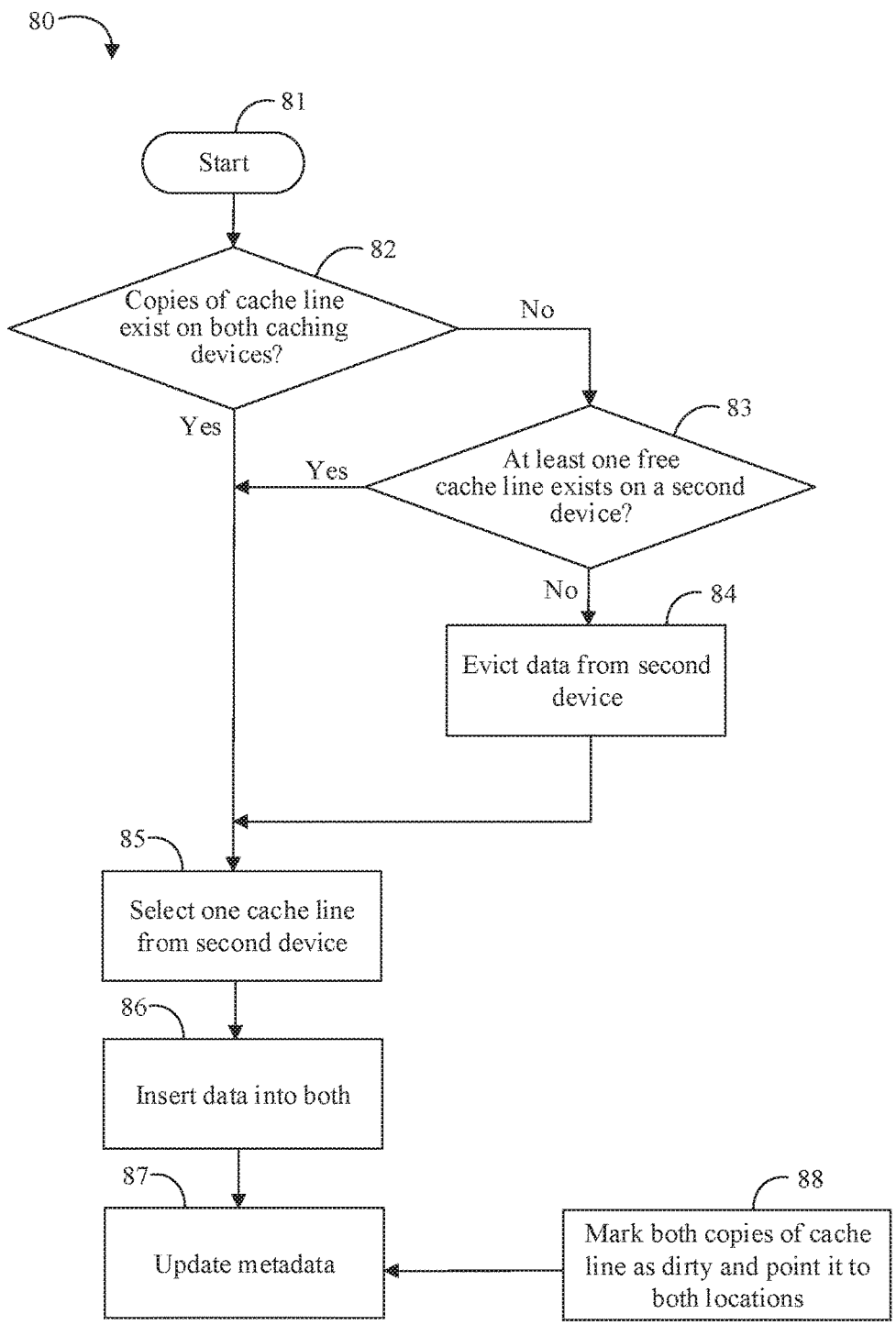
FIG. 8 is a flowchart of an example of a cache line overwrite according to an embodiment.

Turning now to FIG. 8, an embodiment of a method 80 for handling cache line overwrite scenario (e.g. when a clean cache line becomes dirty as a result of, for example, a write-back overwrite) may start at block 81. The method 80 may determine if copies of the cache line exist on each of the caching devices at block 82. If not, the method 80 may determine if at least one free cache line exists on each of the secondary cache devices at block 83. If not, data may be evicted from the secondary devices at block 84 (e.g. based on one or more of the aforementioned eviction policies). If copies of the cache line exist on each of the caching device at block 82, or if at least one free cache line exists on each of the secondary cache devices at block 83, or following the eviction at block 84, the method 80 proceeds to block 85 to select one cache line from each of the secondary cache devices. For example, the selected cache line may be a new cache line (e.g. if eviction happened in block 84 or a free cache was available in block 83). Or a second copy of the cache line may be selected to be overwritten (e.g. if directly coming from block 82). Then the data may be inserted into all the cache lines at block 86 and the cache metadata may be updated at block 87. For example, the method 80 may mark all copies of the cache line as dirty and point it to all locations at block 88.

Figure 9:
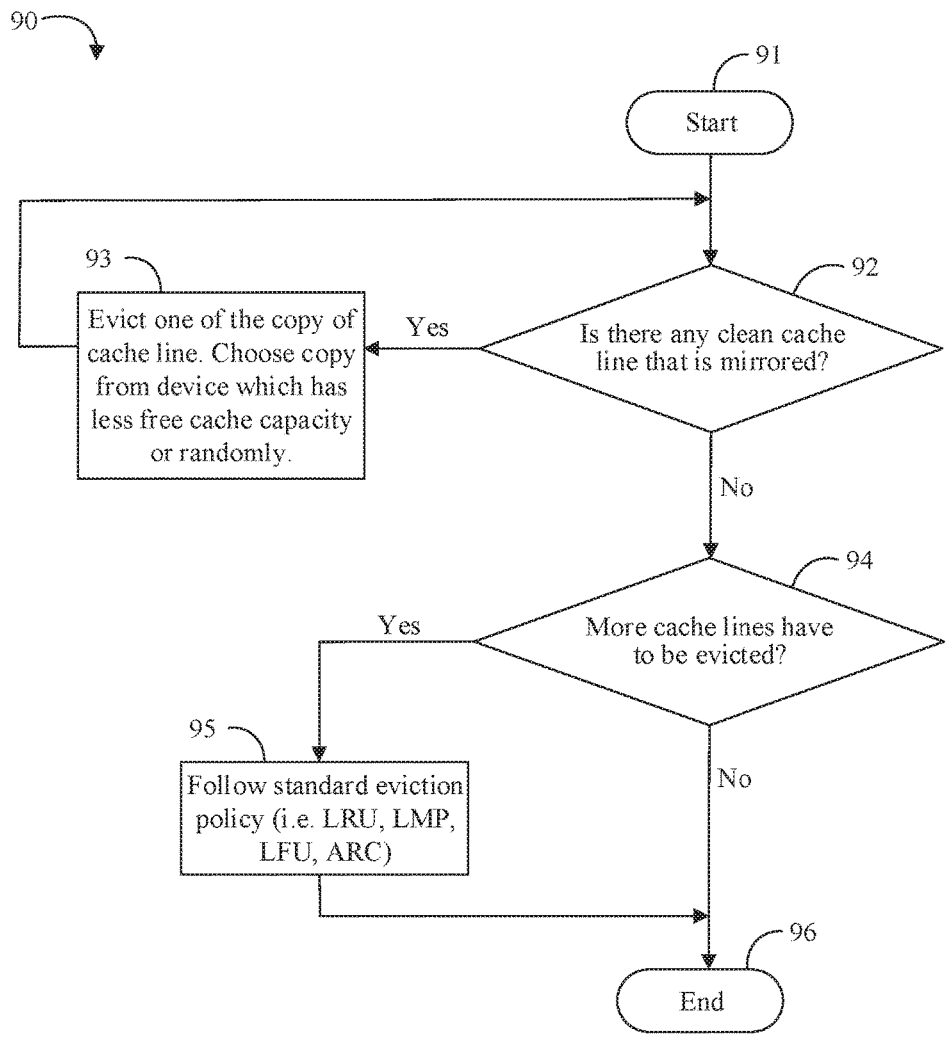
FIG. 9 is a flowchart of an example of evicting cache lines according to an embodiment.

Turning now to FIG. 9, an embodiment of a method 90 of evicting of cache lines may start at block 91. The method 90 may determine if any clean cache line is mirrored at block 92 and, if so, evict one copy of the cache line at block 92. For example, the method 90 may choose to evict the copy from the device which has less free cache capacity (e.g. or randomly) at block 93 (at which point the method 90 may return to block 92. If there are no mirrored clean cache lines at block 92, the method 90 may determine if more cache lines need to be evicted at block 94. If not, the method 90 may end at block 96. If so, the method 90 may follow an eviction policy to evict one or more cache lines as needed at block 95 (e.g. LRU, LMP, LFU, ARC, etc.) after which the method 90 may end at block 96. For example, when a dirty cache line (e.g. that may be mirrored) becomes clean (e.g. as a result of a cleaning algorithm), it may remain duplicated but one or both of the copies may be marked as eligible for eviction (e.g. by moving it to the head of an eviction list).

Non-limiting examples of applications of a safe write-back cache according to an embodiment which may include the proposed methods may include caching hard disk drive (HDD) arrays using a pair of SSDs or any other type of non-volatile media such as NAND memory parts and/or other NVM, embedded caching applications (e.g. where it may be beneficial or required to maintain a replica of dirty data outside of a failure domain, such as a NAND die), and/or safe write-back caching maintaining more than two replicas (for example triple redundant or quadruple redundant replicas; advantageously in such applications the available cache space may grow proportionally with the number of caching devices).

Some embodiments may provide a high reliability write-back as a feature in, for example, INTEL CACHE ACCEL-ERATION SOFTWARE. Some embodiments may be utilized in a high reliability storage array meant to be used as cache or in hybrid or software driven storage array. Some embodiments may be applied to any write-back cache where it may be beneficial or required to replicate the data outside of a failure domain. For example, some embodiments may be applied to an implementation of a protected write-back cache.

Additional Notes and Examples

Example 1 may include an electronic processing system, comprising a processor, persistent storage media communicatively coupled to the processor, system memory communicatively coupled to the processor, and a cache apparatus communicatively coupled to the processor, the persistent storage media, and the system memory, the cache apparatus including a first cache memory, a second cache memory, and a cache controller communicatively coupled to the first cache memory and the second cache memory to allocate a single cache line for clean data from one of either the first cache memory or the second cache memory, and allocate two cache lines for dirty data including one cache line from the first cache memory and one cache line from the second cache memory.

Example 2 may include the electronic processing system of Example 1, wherein the clean data comprises data which is unmodified with respect to corresponding data in the persistent storage media.

Example 3 may include the electronic processing system of Example 1, wherein the dirty data comprises data which is modified with respect to corresponding data in the persistent storage media.

Example 4 may include the electronic processing system of Example 1, wherein each of the first and second cache memories comprise non-volatile memory.

Example 5 may include the electronic processing system of Example 1, wherein the cache controller is further to interleave the clean data among the cache memories.

Example 6 may include the electronic processing system of any of Examples 1 to 2, wherein the cache controller is further to maintain a respective free list for each cache memory.

Example 7 may include a cache apparatus, comprising a first cache memory, a second cache memory, and a cache controller communicatively coupled to the first cache memory and the second cache memory to allocate cache storage for clean data from one of either the first cache memory or the second cache memory, and allocate cache storage for dirty data from both the first cache memory and the second cache memory.

Example 8 may include the cache apparatus of Example 7, wherein the clean data comprises data which is unmodified with respect to corresponding data in a persistent storage media.

Example 9 may include the cache apparatus of Example 7, wherein the dirty data comprises data which is modified with respect to corresponding data in a persistent storage media.

Example 10 may include the cache apparatus of Example 7, wherein each of the first and second cache memories comprise non-volatile memory.

Example 11 may include the cache apparatus of Example 7, wherein the cache controller is further to allocate a single cache line for clean data from one of the either first cache memory or the second cache memory, and allocate two cache lines for dirty data including one cache line from the first cache memory and one cache line from the second cache memory.

Example 12 may include the cache apparatus of Example 11, further comprising one or more additional cache memories communicatively coupled to the cache controller to provide additional protection from data loss, wherein the cache controller is further to allocate a single cache line for clean data from one of the either first cache memory, the second cache memory, or one of the additional cache memories, and allocate multiple cache lines for dirty data including one cache line from each of the first cache memory and the second cache memory, and one cache line from each of the additional cache memories.

Example 13 may include the cache apparatus of any of Examples 7 to 12, wherein the cache controller is further to interleave the clean data among the cache memories.

Example 14 may include the cache apparatus of any of Examples 7 to 12, wherein the cache controller is further to allocate an amount of cache capacity to dirty data.

Example 15 may include the cache apparatus of Example 14, wherein the cache controller is further to retrieve a parameter which corresponds to the amount of cache capacity to allocate to dirty data.

Example 16 may include the cache apparatus of any of Examples 7 to 12, wherein the cache controller is further to maintain a respective free list for each cache memory.

Example 17 may include a method of managing a cache, comprising allocating cache storage for clean data from one of either a first cache memory or a second cache memory, and allocating cache storage for dirty data from both the first cache memory and the second cache memory.

Example 18 may include the method of Example 17, wherein the clean data comprises data which is unmodified with respect to corresponding data in a persistent storage media.

Example 19 may include the method of Example 17, wherein the dirty data comprises data which is modified with respect to corresponding data in a persistent storage media.

Example 20 may include the method of Example 17, wherein each of the first and second cache memories comprise non-volatile memory.

Example 21 may include the method of Example 17, further comprising allocating a single cache line for clean data from one of either the first cache memory or the second cache memory, and allocating two cache lines for dirty data including one cache line from the first cache memory and one cache line from the second cache memory.

Example 22 may include the method of Example 21, further comprising allocating a single cache line for clean data from one of either the first cache memory, the second cache memory, or one of one or more additional cache memories, and allocating multiple cache lines for dirty data including one cache line from each of the first cache memory and the second cache memory, and one cache line from each of the additional cache memories.

Example 23 may include the method of any of Examples 17 to 22, further comprising interleaving the clean data among the cache memories.

Example 24 may include the method of any of Examples 17 to 22, further comprising allocating an amount of cache capacity to dirty data.

Example 25 may include the method of Example 24, further comprising retrieving a parameter corresponding to the amount of cache capacity to allocate to dirty data.

Example 26 may include the method of any of Examples 17 to 22, further comprising maintaining a respective free list for each cache memory.

Example 27 may include at least one computer readable medium comprising a set of instructions, which when executed by a computing device, cause the computing device to allocate cache storage for clean data from one of either a first cache memory or a second cache memory, and allocate cache storage for dirty data from both the first cache memory and the second cache memory.

Example 28 may include the at least one computer readable medium of Example 27, wherein the clean data comprises data which is unmodified with respect to corresponding data in a persistent storage media.

Example 29 may include the at least one computer readable medium of Example 27, wherein the dirty data comprises data which is modified with respect to corresponding data in a persistent storage media.

Example 30 may include the at least one computer readable medium of Example 27, wherein each of the first and second cache memories comprise non-volatile memory.

Example 31 may include the at least one computer readable medium of Example 27, comprising a further set of instructions, which when executed by a computing device, cause the computing device to allocate a single cache line for clean data from one of either the first cache memory or the second cache memory, and allocate two cache lines for dirty data including one cache line from the first cache memory and one cache line from the second cache memory.

Example 32 may include the at least one computer readable medium of Example 31, comprising a further set of instructions, which when executed by a computing device, cause the computing device to allocate a single cache line for clean data from one of either the first cache memory, the second cache memory, or one of one or more additional cache memories, and allocate multiple cache lines for dirty data including one cache line from each of the first cache memory and the second cache memory, and one cache line from each of the additional cache memories.

Example 33 may include the at least one computer readable medium of any of Examples 27 to 32, comprising a further set of instructions, which when executed by a computing device, cause the computing device to interleave the clean data among the cache memories.

Example 34 may include the at least one computer readable medium of any of Examples 27 to 32, comprising a further set of instructions, which when executed by a computing device, cause the computing device to allocate an amount of cache capacity to dirty data.

Example 35 may include the at least one computer readable medium of Example 34, comprising a further set of instructions, which when executed by a computing device, cause the computing device to retrieve a parameter corresponding to the amount of cache capacity to allocate to dirty data.

Example 36 may include the at least one computer readable medium of any of Examples 27 to 32, comprising a further set of instructions, which when executed by a computing device, cause the computing device to maintain a respective free list for each cache memory.

Example 37 may include a cache apparatus, comprising means for allocating cache storage for clean data from one of either a first cache memory or a second cache memory, and means for allocating cache storage for dirty data from both the first cache memory and the second cache memory.

Example 38 may include the cache apparatus of Example 37, wherein the clean data comprises data which is unmodified with respect to corresponding data in a persistent storage media.

Example 39 may include the cache apparatus of Example 37, wherein the dirty data comprises data which is modified with respect to corresponding data in a persistent storage media.

Example 40 may include the cache apparatus of Example 37, wherein each of the first and second cache memories comprise non-volatile memory.

Example 41 may include the cache apparatus of Example 37, further comprising means for allocating a single cache line for clean data from one of either the first cache memory or the second cache memory, and means for allocating two cache lines for dirty data including one cache line from the first cache memory and one cache line from the second cache memory.

Example 42 may include the cache apparatus of Example 41, further comprising means for allocating a single cache line for clean data from one of either the first cache memory, the second cache memory, or one of one or more additional cache memories, and means for allocating multiple cache lines for dirty data including one cache line from each of the first cache memory and the second cache memory, and one cache line from each of the additional cache memories.

Example 43 may include the cache apparatus of any of Examples 37 to 42, further comprising means for interleaving the clean data among the cache memories.

Example 44 may include the cache apparatus of any of Examples 37 to 42, further comprising means for allocating an amount of cache capacity to dirty data.

Example 45 may include the cache apparatus of Example 44, further comprising means for retrieving a parameter corresponding to the amount of cache capacity to allocate to dirty data.

Example 46 may include the cache apparatus of any of Examples 37 to 42, further comprising means for maintaining a respective free list for each cache memory.

Example 47 may include a redundant memory apparatus, comprising a first memory, a second memory, and a memory controller communicatively coupled to the first memory and the second memory to allocate redundant storage for clean data from one of either the first memory or the second memory, and allocate redundant storage for dirty data from both the first memory and the second memory.

Example 48 may include the redundant memory apparatus of Example 47, wherein the clean data comprises data which is unmodified with respect to corresponding data in a persistent storage media.

Example 49 may include the redundant memory apparatus of Example 47, wherein the dirty data comprises data which is modified with respect to corresponding data in a persistent storage media.

Example 50 may include the redundant memory apparatus of Example 47, wherein each of the first and second memories comprise non-volatile memory.

Example 51 may include the redundant memory apparatus of Example 47, wherein the memory controller is further to interleave the clean data among the first and second memories.

Example 52 may include the redundant memory apparatus of any of Example 47, wherein the memory controller is further to retrieve a parameter which corresponds to an amount of memory capacity to allocate to dirty data.

Example 53 may include the redundant memory apparatus of Example 47, wherein the memory controller is further to maintain a respective free list for each of the first and second memories.

Example 54 may include a method of inserting clean data in a redundant cache, comprising determining if free cache lines are available, evicting cache entries from at least one cache device if no cache lines are available, selecting a free cache line from one cache device of the redundant cache, and inserting the clean data in the selected cache line.

Example 55 may include the method of Example 54, wherein the clean data comprises data which is unmodified with respect to corresponding data in a persistent storage media.

Example 56 may include the method of Example 54, wherein each of the cache devices comprise non-volatile memory.

Example 58 may include the method of Example 54, further comprising selecting the free cache line from a cache device having the longest free list or randomly if all free lists are the same size.

Example 59 may include the method of any of Examples 54 to 58, further comprising updating the redundant cache metadata.

Example 60 may include a method of inserting dirty data in a redundant cache, comprising determining if at least one free cache line is available on all caching devices of the redundant cache, evicting cache entries from each cache device which is determined to not have at least one free cache line, selecting a free cache line from each cache device, and inserting the dirty cache data into each selected cache line.

Example 61 may include the method of Example 60, wherein the dirty data comprises data which is modified with respect to corresponding data in a persistent storage media.

Example 62 may include the method of Example 60, wherein each of the cache devices comprise non-volatile memory.

Example 63 may include the method of Example 60, further comprising updating the redundant cache metadata.

Example 64 may include the method of Example 63, further comprising marking all copies of the cache line as dirty, and pointing the redundant cache metadata to all locations of the dirty data.

Example 65 may include a method of evicting of a cache line in a redundant cache, comprising determining if a clean cache line is mirrored, evicting one copy of a mirrored cache line, determining if more cache lines need to be evicted, and following an eviction policy to evict one or more cache lines as determined.

Example 66 may include the method of Example 65, wherein the clean cache line comprises data which is unmodified with respect to corresponding data in a persistent storage media.

Example 67 may include the method of Example 65, further comprising evicting one copy of the mirrored cache line from a device which has less free cache capacity.

Example 68 may include the method of Example 67, wherein the device comprises non-volatile memory.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A method of managing a cache, comprising:
    allocating cache storage for clean data from one of either a first cache memory or a second cache memory, wherein the allocating cache storage for the clean data includes allocating a single cache line for the clean data from the one of either the first cache memory or the second cache memory so that the clean data is written into the single cache line; and
    allocating cache storage for dirty data from both the first cache memory and the second cache memory, wherein the allocating cache storage for the dirty data includes allocating two cache lines for the dirty data including one cache line from the first cache memory and one cache line from the second cache memory so that the dirty data is written into each of the one cache lines from the first and second cache memories.

2. The method of claim 1, wherein the clean data comprises data which is unmodified with respect to corresponding data in a persistent storage media.

3. The method of claim 1, wherein the dirty data comprises data which is modified with respect to corresponding data in a persistent storage media.

4. The method of claim 1, wherein each of the first and second cache memories comprise non-volatile memory.

5. The method of claim 1, further comprising:
    allocating a single cache line for clean data from one of the first cache memory, the second cache memory, or one of one or more additional cache memories; and
    allocating multiple cache lines for dirty data including one cache line from each of the first cache memory and the second cache memory, and one cache line from each of the one or more additional cache memories.

6. The method of claim 1, further comprising:
    interleaving clean data among the first and second cache memories.

7. An electronic processing system, comprising:
    a processor;
    persistent storage media communicatively coupled to the processor;
    system memory communicatively coupled to the processor; and
    a cache apparatus communicatively coupled to the processor, the persistent storage media, and the system memory, the cache apparatus including:
        a first cache memory;
        a second cache memory; and
        a cache controller communicatively coupled to the first cache memory and the second cache memory to:
            allocate a single cache line for clean data from one of either the first cache memory or the second cache memory so that the clean data is written into the single cache line, and
            allocate two cache lines for dirty data including one cache line from the first cache memory and one cache line from the second cache memory so that the dirty data is written into each of the one cache lines from the first and second cache memories.

8. The electronic processing system of claim 7, wherein the clean data comprises data which is unmodified with respect to corresponding data in the persistent storage media.

9. The electronic processing system of claim 7, wherein the dirty data comprises data which is modified with respect to corresponding data in the persistent storage media.

10. The electronic processing system of claim 7, wherein each of the first and second cache memories comprise non-volatile memory.

11. A cache apparatus, comprising:
    a first cache memory;
    a second cache memory; and
    a cache controller communicatively coupled to the first cache memory and the second cache memory to:
        allocate cache storage for clean data from one of either the first cache memory or the second cache memory, wherein to allocate the cache storage for the clean data, the cache controller is to allocate a single cache line for the clean data from the one of either the first cache memory or the second cache memory so that the clean data is written into the single cache line, and allocate cache storage for dirty data from both the first cache memory and the second cache memory, wherein to allocate the cache storage for the dirty data, the cache controller is to allocate two cache lines for the dirty data including one cache line from the first cache memory and one cache line from the second cache memory so that the dirty data is written into each of the one cache lines from the first and second cache memories.

12. The cache apparatus of claim 11, wherein the clean data comprises data which is unmodified with respect to corresponding data in a persistent storage media.

13. The cache apparatus of claim 11, wherein the dirty data comprises data which is modified with respect to corresponding data in a persistent storage media.

14. The cache apparatus of claim 11, wherein each of the first and second cache memories comprise non-volatile memory.

15. The cache apparatus of claim 11, further comprising:
one or more additional cache memories communicatively coupled to the cache controller to provide additional protection from data loss, wherein the cache controller is further to:
allocate a single cache line for clean data from one of the first cache memory, the second cache memory, or one of the one or more additional cache memories; and
allocate multiple cache lines for dirty data including one cache line from each of the first cache memory and the second cache memory, and one cache line from each of the one or more additional cache memories.

16. The cache apparatus of claim 11, wherein the cache controller is further to interleave clean data among the first and second cache memories.

17. At least one computer readable storage medium comprising a set of instructions, which when executed by a computing device, cause the computing device to:
allocate cache storage for clean data from one of either a first cache memory or a second cache memory, wherein to allocate the cache storage for the clean data, the computing device is to allocate a single cache line for the clean data from the one of either the first cache memory or the second cache memory so that the clean data is written into the single cache line; and
allocate cache storage for dirty data from both the first cache memory and the second cache memory, wherein to allocate the cache storage for the dirty data, the computing device is to allocate two cache lines for the dirty data including one cache line from the first cache memory and one cache line from the second cache memory so that the dirty data is written into each of the one cache lines from the first and second cache memories.

18. The at least one computer readable storage medium of claim 17, wherein the clean data comprises data which is unmodified with respect to corresponding data in a persistent storage media.

19. The at least one computer readable storage medium of claim 17, wherein the dirty data comprises data which is modified with respect to corresponding data in a persistent storage media.

20. The at least one computer readable storage medium of claim 17, wherein each of the first and second cache memories comprise non-volatile memory.

21. The at least one computer readable storage medium of claim 17, comprising a further set of instructions, which when executed by a computing device, cause the computing device to:
allocate a single cache line for clean data from one of the first cache memory, the second cache memory, or one of one or more additional cache memories; and
allocate multiple cache lines for dirty data including one cache line from each of the first cache memory and the second cache memory, and one cache line from each of the one or more additional cache memories.

22. The at least one computer readable storage medium of claim 17, comprising a further set of instructions, which when executed by a computing device, cause the computing device to:
interleave clean data among the first and second cache memories.

* * * * *